US012649546B2

(12) United States Patent
Christopher

(10) Patent No.: US 12,649,546 B2
(45) Date of Patent: Jun. 9, 2026

(54) UNDERWATER ANCHORING DEVICES, SYSTEMS, AND METHODS

(71) Applicant: Verterra Energy Inc., St Paul, MN (US)

(72) Inventor: Theodore J. Christopher, St Paul, MN (US)

(73) Assignee: Verterra Energy Inc., New Brighton, MN (US)

( * ) Notice: Subject to any disclaimer, the term of this patent is extended or adjusted under 35 U.S.C. 154(b) by 445 days.

(21) Appl. No.: 18/216,966

(22) Filed: Jun. 30, 2023

(65) Prior Publication Data

US 2025/0002118 A1     Jan. 2, 2025

(51) Int. Cl.
| | |
|---|---|
| *B63B 21/50* | (2006.01) |
| *B63B 21/04* | (2006.01) |
| *B63B 21/20* | (2006.01) |
| *B63B 35/44* | (2006.01) |

(Continued)

(52) U.S. Cl.
CPC .............. *B63B 21/50* (2013.01); *B63B 21/04* (2013.01); *B63B 21/20* (2013.01); *B63B 2021/203* (2013.01); *B63B 2035/4466* (2013.01); *F03B 13/10* (2013.01); *F03B 17/06* (2013.01); *F03B 17/062* (2013.01); *Y02E 10/20* (2013.01)

(58) Field of Classification Search
CPC ......... B63B 21/50; B63B 21/04; B63B 21/20; B63B 2021/203; B63B 2035/4466; B63B 21/24; B63B 2209/14; B63B 2205/00; F03B 13/10; F03B 13/12; F03B 17/06; F03B 17/062; Y02E 10/20

USPC ........................................................ 114/293
See application file for complete search history.

(56) References Cited

U.S. PATENT DOCUMENTS

| | | | |
|---|---|---|---|
| 372,148 | A | 10/1887 | Henderson |
| 1,027,501 | A | 5/1912 | Pearson |
| 3,341,450 | A | 9/1967 | Ciabattari |

(Continued)

FOREIGN PATENT DOCUMENTS

| | | |
|---|---|---|
| EP | 0439267 | 3/1994 |
| EP | 2713043 | 4/2014 |

(Continued)

OTHER PUBLICATIONS

International Search Report for Application No. PCT/US2011/058708, dated May 11, 2012, 9 pages.

(Continued)

*Primary Examiner* — Marc Q Jimenez
*Assistant Examiner* — Eric Anthony Starck
(74) *Attorney, Agent, or Firm* — Fish & Richardson P.C.

(57) ABSTRACT

The subject matter of this specification can be embodied in, among other things, a method of submersible deployment that includes submersing a submersible turbine toward an anchor seated along a bottom of a body of water so that tail portion of the submersible turbine is oriented closer to a cap of the anchor and upstream of a nose portion of the submersible turbine, urging the submersible turbine against a direction of flow of the body of water such that a channel defined along a ventral portion of the submersible turbine is drawn over a cap of the anchor, and while the cap is slidably engaged the submersible turbine, rotating the submersible turbine about the cap such that the nose portion is oriented upstream of the tail portion.

19 Claims, 9 Drawing Sheets

(51) Int. Cl.
*F03B 13/10* (2006.01)
*F03B 17/06* (2006.01)

(56) References Cited

U.S. PATENT DOCUMENTS

| | | |
|---|---|---|
| 3,928,771 A | 12/1975 | Straumsnes |
| 4,014,526 A | 3/1977 | Cramer |
| 4,045,148 A | 8/1977 | Morin |
| 4,084,918 A | 4/1978 | Pavlecka |
| 4,088,419 A | 5/1978 | Hope |
| 4,095,422 A | 6/1978 | Kurakake |
| 4,156,580 A | 5/1979 | Phol |
| 4,191,505 A | 3/1980 | Kaufman |
| 4,278,896 A | 7/1981 | McFarland |
| 4,289,971 A | 9/1981 | Ueda |
| 4,368,392 A | 1/1983 | Drees |
| 4,383,797 A | 5/1983 | Lee |
| 4,396,843 A | 8/1983 | Martinez |
| 4,416,584 A | 11/1983 | Norquest |
| 4,664,596 A | 5/1987 | Wood |
| 4,686,376 A | 8/1987 | Retz |
| 4,900,227 A | 2/1990 | Trouplin |
| 4,958,986 A | 9/1990 | Boussuges |
| 4,960,363 A | 10/1990 | Bergstein |
| 5,083,899 A | 1/1992 | Koch |
| 5,137,417 A | 8/1992 | Lund |
| 5,252,029 A | 10/1993 | Barnes |
| 5,332,354 A | 7/1994 | Lamont |
| 5,447,412 A | 9/1995 | Lamont |
| D368,480 S | 4/1996 | Thirumalaisamy et al. |
| D377,199 S | 1/1997 | Vermy |
| 5,664,418 A | 9/1997 | Walters |
| 5,852,331 A | 12/1998 | Giorgini |
| 5,969,430 A | 10/1999 | Forrey |
| 5,971,820 A | 10/1999 | Morales |
| 6,132,172 A | 10/2000 | Li |
| 6,135,716 A | 10/2000 | Billdal et al. |
| 6,158,953 A | 12/2000 | Lamont |
| 6,448,668 B1 | 9/2002 | Robitaille |
| 6,448,669 B1 | 9/2002 | Elder |
| 6,638,005 B2 | 10/2003 | Holter |
| 6,942,454 B2 | 9/2005 | Ohlmann |
| 6,981,839 B2 | 1/2006 | Fan |
| 7,040,859 B2 | 5/2006 | Kane |
| 7,108,482 B2 | 9/2006 | Chapman |
| 7,198,470 B2 | 4/2007 | Enomoto et al. |
| D543,495 S | 5/2007 | Williams |
| D554,150 S | 10/2007 | Fausett et al. |
| 7,284,949 B2 | 10/2007 | Haworth |
| D554,546 S | 11/2007 | Hart |
| D564,042 S | 3/2008 | Roy |
| 7,341,424 B2 | 3/2008 | Dial |
| 7,344,353 B2 | 3/2008 | Naskali et al. |
| 7,441,988 B2 | 10/2008 | Manchester |
| 7,471,009 B2 | 12/2008 | Davis et al. |
| D587,195 S | 2/2009 | Van Wijck |
| 7,492,054 B2 | 2/2009 | Catlin |
| 7,494,315 B2 | 2/2009 | Hart |
| 7,498,683 B2 | 3/2009 | Landwehr |
| D594,818 S | 6/2009 | Doucet |
| 7,573,148 B2 | 8/2009 | Nica |
| 7,728,454 B1 | 6/2010 | Anderson, Jr. |
| 7,736,127 B1 | 6/2010 | Carr |
| 7,791,214 B2 | 9/2010 | Hill |
| 8,083,438 B2 | 12/2011 | Bailey |
| D652,794 S | 1/2012 | Christopher |
| 8,096,749 B2 | 1/2012 | Yang |
| 8,167,533 B2 | 5/2012 | Lucy |
| 8,378,518 B2 | 2/2013 | Khavari |
| 8,432,056 B2 | 4/2013 | Bailey |
| 8,487,468 B2 | 7/2013 | Christopher |
| 8,591,170 B1 | 11/2013 | Rawls |
| 8,616,830 B2 | 12/2013 | Unno |
| 8,624,420 B2 | 1/2014 | Christopher |
| 8,777,556 B2 | 7/2014 | O'Neil |

| | | | |
|---|---|---|---|
| 8,840,360 B2 | 9/2014 | Quintal | |
| D715,223 S | 10/2014 | Pepi | |
| 9,115,685 B2 | 8/2015 | Ross | |
| 9,291,146 B2 | 3/2016 | Christopher | |
| 9,322,385 B1 | 4/2016 | Hallett | |
| 9,739,153 B2 | 8/2017 | Behrens | |
| 9,982,655 B2 | 5/2018 | Behrens | |
| 10,982,643 B1 | 4/2021 | Petrov | |
| 2003/0053909 A1 | 3/2003 | O'Hearen | |
| 2003/0133782 A1 | 7/2003 | Holter | |
| 2004/0223840 A1 | 11/2004 | Vogiatzis et al. | |
| 2005/0169742 A1 | 8/2005 | Kane | |
| 2005/0285407 A1 | 12/2005 | Davis et al. | |
| 2006/0198724 A1 | 9/2006 | Bertony | |
| 2006/0233647 A1 | 10/2006 | Saunders | |
| 2007/0041823 A1* | 2/2007 | Miller | F03D 1/0608 |
| | | | 415/4.1 |
| 2007/0258806 A1 | 11/2007 | Hart | |
| 2008/0050993 A1 | 2/2008 | Mackie | |
| 2009/0026767 A1 | 1/2009 | Petrounevitch | |
| 2009/0045631 A1* | 2/2009 | Gibberd | F03B 17/061 |
| | | | 414/803 |
| 2009/0047131 A1 | 2/2009 | Neumann | |
| 2009/0146430 A1* | 6/2009 | Sear | F03B 17/061 |
| | | | 290/54 |
| 2009/0194997 A1 | 8/2009 | Stabins | |
| 2010/0019499 A1 | 1/2010 | Perner et al. | |
| 2010/0025998 A1 | 2/2010 | Williams | |
| 2010/0135768 A1 | 6/2010 | Pitre | |
| 2010/0148509 A1 | 6/2010 | Ortiz | |
| 2010/0213271 A1 | 8/2010 | Bailey | |
| 2010/0213716 A1 | 8/2010 | Santoro | |
| 2010/0213720 A1 | 8/2010 | Bailey | |
| 2010/0276935 A1 | 11/2010 | Dehlsen et al. | |
| 2010/0276940 A1 | 11/2010 | Khavari | |
| 2010/0283251 A1 | 11/2010 | Reynolds | |
| 2011/0018277 A1 | 1/2011 | Brace | |
| 2011/0148117 A1 | 6/2011 | Bailey | |
| 2011/0309624 A1 | 12/2011 | Thuppale et al. | |
| 2012/0098262 A1 | 4/2012 | Da Cunha | |
| 2012/0119500 A1 | 5/2012 | Christopher | |
| 2012/0294705 A1 | 11/2012 | Unno | |
| 2013/0294922 A1 | 11/2013 | Christopher | |
| 2013/0333370 A1 | 12/2013 | Hopper | |
| 2014/0110946 A1 | 4/2014 | Christopher | |
| 2014/0145445 A1 | 5/2014 | Richer et al. | |
| 2014/0284925 A1 | 9/2014 | Ross | |
| 2015/0285078 A1 | 10/2015 | Behrens | |
| 2015/0285219 A1 | 10/2015 | Behrens | |
| 2016/0195058 A1 | 7/2016 | Christopher | |
| 2017/0089326 A1 | 3/2017 | Farb | |
| 2017/0122283 A1 | 5/2017 | Christopher | |
| 2018/0156186 A1 | 6/2018 | Christopher | |

FOREIGN PATENT DOCUMENTS

| | | | | |
|---|---|---|---|---|
| GB | 2 269 859 | 2/1994 | | |
| JP | 2005-054724 | 3/2005 | | |
| JP | 2007-303459 | 11/2007 | | |
| JP | 2010-537100 | 12/2010 | | |
| JP | 2011-509368 | 3/2011 | | |
| KR | 10-0854793 | 8/2008 | | |
| KR | 10-2009-0080275 | 7/2009 | | |
| WO | WO 2009/086593 | 7/2009 | | |
| WO | WO 2010/116983 | 10/2010 | | |
| WO | WO 2012/153107 | 11/2012 | | |
| WO | WO-2012153107 A1 * | 11/2012 | | F03B 13/10 |
| WO | WO-2015197694 A1 * | 12/2015 | | F03B 13/10 |
| WO | WO-2017176179 A1 * | 10/2017 | | F03B 13/26 |

OTHER PUBLICATIONS

BioPower Systems images, Australia, 2 pages [publicly available prior to Nov. 12, 2010]. Retrieved from the Internet: <URL: http://www.biopowersystems.com/images.php>.

EP Extended Search Report in EP Appln. No. 1680894.1, dated Mar. 20, 2019, 7 pages.

(56)                    References Cited

OTHER PUBLICATIONS

Haugen, "Minnesota startup hopes to spin out new hydroturbine design," Midwest Energy News (Jun. 28, 2012) [retrieved on Jul. 3, 2012], at http://www.midwestenergynews.com/2012/06/28/minnesota-startup-hopes-to-spin-out-new-hydroturbine-design/, 2 pages.

International Search Report in Written Opinion in International Application No. PCT/US2016/059362, dated Dec. 29, 2016, 13 pages.

Japanese Office Action dated Sep. 18, 2015 for Application No. 2013-538780, 7 pages (with English Translation).

Pacella, 'Invention Awards: A Fish-Friendly Tidal Turbine' [online]. Popular Science, May 20, 2010, 3 pages [retrieved on Nov. 15, 2010]. Retrieved from the Internet: <URL: http://www.popsci.com/diy/article/2010-05/invention-awards-fish-friendly-tidal-turbine>.

Partial Supplementary European Search Report in Application No. 11840556.2, dated May 15, 2018, 15 pages.

Pelamis Wave Power, 1 page [publicly available prior to Nov. 12, 2010]. Retrieved from the Internet: <URL: http://www.pelamiswave.com/our-technology/pelamis-wec>.

Verdant Power, 2009, 2 pages [publicly available prior to Nov. 12, 2010]. Retrieved from the Internet: <URL: http://verdantpower.com/what-systemsint/>.

International Search Report and Written Opinion in International Application No. PCT/US2024/36088, mailed on Oct. 16, 2024, 16 pages.

International Preliminary Report on Patentability in International Appln. No. PCT/US2024/036088, mailed on Jan. 15, 2026, 9 pages.

* cited by examiner

UNDERWATER ANCHORING DEVICES, SYSTEMS, AND METHODS

TECHNICAL FIELD

This document relates to anchor techniques for a submersible apparatus, for example, diverless anchoring of a submersible turbine system that rotates to generate electrical power from fluid flow.

BACKGROUND

Various turbine systems generate electrical power in response to rotation of a turbine. For example, numerous wind turbine systems attempt to harvest the wind energy from air flow over a set of wind turbine blades, which drive the wind turbine blades to rotate about an axis and thereby drive an internal generator to output electrical energy. In another example, conventional hydro turbine systems seek to convert energy from water currents in rivers or tidal currents in oceans or seas into electrical energy. Some turbine systems include turbines that rotate about a vertical axis, for example, in response to fluid flow in a direction generally perpendicular to the vertical axis.

Deployment of underwater structures and devices can be difficult and costly to perform. Underwater construction requires the time and talents of divers with specialized construction skills. Such work is often made even more challenging and potentially hazardous by the water currents present at locations where flows are sufficient to actuate turbine systems.

SUMMARY

In general, this document describes anchors for diverless anchoring of submersible apparatuses. In some examples, the anchors provide a pivotable mount for a turbine that rotates in response to off-axis fluid flow, such as water flowing in a generally horizontal direction generally perpendicular to a vertical axis of rotation. A rampart device may act as a shield apparatus and may direct and control flow upstream or otherwise proximate the turbine. In some examples, the turbine system employs a synergistic combination of fluid dynamics principals to harvest the kinetic energy of moving water or other fluid for conversion into mechanical rotary motion. For example, the turbine system can provide a vertical-axis turbine that rotates in one direction regardless of the direction of the fluid flow, and that may be positioned with a rampart device that directs flow proximate the turbine to protect and promote energy harvesting by the turbine system.

In a general example, a submersible system includes an anchor having a cap configured to be submerged along a bottom of a body of water, and a submersible turbine configured to rotate relative to the anchor while submerged to releasable lock the submersible turbine to the anchor.

Various examples can include some, all, or none of the following features. The submersible turbine can include a socket in the lower face to releasably mate with cap of the anchor. The submersible turbine can include an outer housing having a hydrodynamic shape configured to orient the submersible turbine relative to a fluid flow and having a hydrodynamic center, the outer housing defining a bow portion, a stern portion, and a ventral portion, a primary attachment point configured to affix the submersible turbine to a tether, and a deployment attachment point arranged proximal the stern portion and configured to releasably affix the submersible turbine to a tether, wherein a channel is defined in the outer housing and extends from an open end proximal the stern portion and configured to receive the cap, to a terminal end arranged forward of the hydrodynamic center and configured to at least partly retain the cap. The outer housing can be configured to produce a ventral downforce based on a forward fluid flow from the bow portion toward the stern portion, and can be configured to produce substantially offsetting ventral downforce and dorsal lift based on a reverse fluid flow from the stern portion toward the bow portion. The channel can be configured as a U-shaped channel proximal to the open end, and the channel can be configured as a C-shaped channel proximal to the terminal end and configured to at least partly retain the cap.

In another general example, a method of submersible deployment includes submersing a submersible turbine toward an anchor seated along a bottom of a body of water so that tail portion of the submersible turbine is oriented closer to a cap of the anchor and upstream of a nose portion of the submersible turbine, urging the submersible turbine against a direction of flow of the body of water such that a channel defined along a ventral portion of the submersible turbine is drawn over a cap of the anchor, and while the cap is slidably engaged the submersible turbine, rotating the submersible turbine about the cap such that the nose portion is oriented upstream of the tail portion.

Various examples can include some, all, or none of the following features. The method can include arranging an anchor at a predetermined location proximal to a bottom of a region of a body of fluid having a direction of flow, orienting a tail portion of the submersible turbine into the direction of flow, the submersible turbine having a hydrodynamic center and defining a nose portion, the tail portion, a ventral portion, and a channel defined along the ventral portion, the channel having an open portion extending from an open end proximal to the tail portion to a partly enclosed portion having a terminal end arranged forward of the hydrodynamic center, engaging the cap of the anchor within the open portion, retaining the cap within the partly enclosed portion, urging the submersible turbine with the direction of flow such that the channel is drawn over the cap, and contacting the cap with a terminal end of the channel along a ventral portion of the submersible turbine in response to movement the submersible turbine with the direction of flow. Arranging the anchor at the predetermined location proximal to the bottom of a region of a body of fluid having the direction of flow can include screwing the anchor into the bottom, or submerging the anchor to the bottom. The method can include affixing a tether to the submersible turbine, extending the tether from the submersible turbine, through a retainer of the anchor, to a tether retractor apparatus, where submersing the submersible turbine toward the anchor comprises retracting, by the tether retractor apparatus, and drawing, by the tether, submersible turbine toward the retainer. The method can include electrically connecting a tether to the submersible turbine and to an electrical load, wherein the submersible turbine comprises an electrical generator configured to generate an electrical current along the tether. The method can include affixing a tether to a deployment attachment point arranged proximal to a tail portion of the submersible turbine, tensioning the tether, and urging the tail portion of the submersible turbine into the direction of flow based on the direction of flow and the arrangement of the deployment attachment point. The method can include urging a ventral downforce based on a hydrodynamic shape of the submersible turbine and a forward fluid flow from the nose portion toward the tail portion, and produce substantially offsetting ventral downforce or dorsal lift based on a hydrodynamic configuration of the submersible turbine and a reverse fluid flow from the tail portion toward the nose portion. The method can include drawing the channel over the cap, escaping the cap from the channel, and surfacing the submersible turbine based on a positive buoyancy of the submersible turbine.

In another general example, an assembly for submersible use includes an anchor having a cap, and a base affixed to the cap and configured to maintain a position submerged at a predetermined location proximal a bottom of a region of a flowing body of fluid, and a submersible apparatus having an outer housing having a hydrodynamic shape configured to orient the submersible apparatus relative to a fluid flow and having a hydrodynamic center, the outer housing defining a bow portion, a stern portion, and a ventral portion, and a channel defined along the ventral portion and extending from an open end proximal the stern portion and configured to receive the cap, to a terminal end arranged forward of the hydrodynamic center and configured to at least partly retain the cap.

Various examples can include some, all, or none of the following features. The channel can be configured as a U-shaped channel proximal to the open end, and the channel is configured as a C-shaped channel proximal to the terminal end. The base can include a screw piling anchor or a gravity anchor. The submersible apparatus can include a primary attachment point configured to affix the submersible apparatus to a tether, and a deployment attachment point arranged proximal the stern portion and configured to releasably affix the submersible apparatus to a tether. The anchor can include a tether retainer configured to retain a tether arranged therethrough. The outer housing can be configured to produce a ventral downforce based on a forward fluid flow from the bow portion toward the stern portion, and is configured to produce substantially offsetting ventral downforce and dorsal lift based on a reverse fluid flow from the stern portion toward the bow portion. The submersible apparatus can include a vertical-axis turbine that rotates about an axis in response to fluid flowing toward the vertical-axis turbine in a flow direction that is generally perpendicular to the axis, the vertical-axis turbine including a dorsal portion and a plurality of dorsally protruding fins extending from an outer region proximate an outer periphery of the vertical-axis turbine.

The systems and techniques described here may provide one or more of the following advantages. First, a system can provide diverless deployment and anchoring of underwater turbines or other submersible assemblies. Second, the system can reduce the need for heavy equipment during deployment. Third, the system can utilize ambient fluid flow to assist with the deployment and positioning of the submersible assembly. Fourth, the system can provide pivotable movement to facilitate dynamic positioning of the submersible apparatus relative to changing flow direction, velocity, and/or depth. Fifth, the system can have positive buoyancy to facilitate retrieval and/or maintenance at the fluid surface, reducing the need to retrieval to shore. Sixth, the system can be anchored in natural bodies of water, or can be anchored in canals or other artificial waterways without penetrating the waterway floor. Seventh, the system can provide a dynamic hybrid axis of attached devices (e.g. such as for a turbine system whether vertical or horizontal axis of rotation is utilized). For example, the system dynamically pivots the angle of attack based on water flow velocity. Eighth, the system can provide increased durability of attached devices by allowing attached devices to pivot in three dimensions upon impact from debris in the flow. Ninth, the system can provide increased resistance to clogging and jamming from debris by allowing attached devices to pivot in three dimensions to allow debris to move more easily and slip off when the device is in motion. Tenth, in some implementations, energy generated by the system can reduce the production of greenhouse gases or otherwise mitigate climate change compared to conventional energy generation from fossil fuels. Eleventh, in some implementations, the system can generate energy from moving water without substantially altering or disrupting a natural waterway, unlike the environmental modifications associated with dam-based power generation.

The details of one or more implementations are set forth in the accompanying drawings and the description below. Other features and advantages will be apparent from the description and drawings, and from the claims.

DETAILED DESCRIPTION

This document describes anchors and techniques for anchoring of submersible apparatuses, such as diverless anchoring of underwater turbine generators. In general, an anchor having an upwardly-protruding ball or attachment feature is placed at the bottom of a river, canal, or other body of flowing water. A submersible apparatus is submerged toward the anchor such that a partly enclosed channel in the bottom of the submersible apparatus is slotted over the ball, capturing the ball and removably affixing the submersible apparatus to the anchor. In some examples, the submersible apparatus can rotate relative to the anchor assembly while submerged to releasably lock the submersible apparatus to the anchor assembly. For example, the submersible apparatus includes a socket in the lower face to releasably mate with a rounded cap of the anchor assembly. As will be described in more detail below, such configurations permit deployment and anchoring of submersible apparatuses entirely from above water, substantially without the need for divers. Such configurations can reduce cost and resources, and promote safety and efficiency, of deployment, retrieval, and/or other underwater assembly operations.

Figure 1:
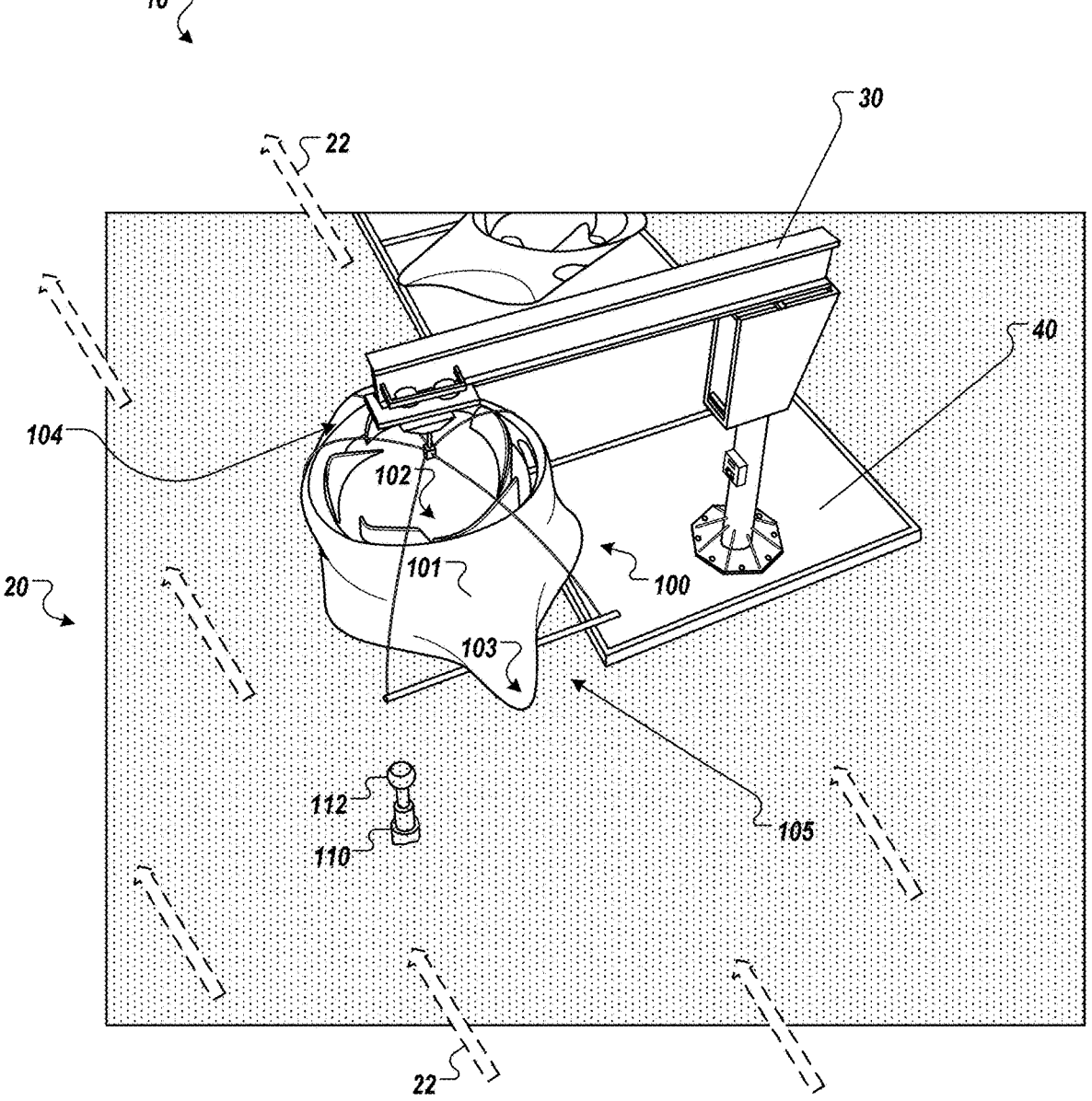
FIG. 1 is a schematic diagram that shows an example of a system for deployment and retrieval of an example submersible apparatus.

FIG. 1 is a schematic diagram that shows an example of a system 10 for submersible deployment and retrieval of an example submersible apparatus 100. In the illustrated example, the submersible apparatus 100 is an electrical generator turbine system configured to generate electrical power. The submersible apparatus 100 can be assembled and otherwise prepared close to the deployment location (e.g., on shore or on a ship, boat, or barge).

An anchor assembly 110 is placed at a predetermined location at the bottom of a flowing body of water 20 (e.g., a river, stream, canal) or other fluid having a fluid flow or current in a flow direction (represented by arrows 22). The anchor assembly 110 includes a cap 112, such as a ball joint, that is configured to be releasably engaged by the submersible apparatus 100. Details of an example of this engagement are discussed further in the descriptions of FIGS. 4-8.

The submersible apparatus 100 includes an outer housing 101. The outer housing has a hydrodynamic shape that is configured to orient the submersible apparatus 100 relative to the fluid flow 22 about a hydrodynamic center 102. The outer housing 101 defines a front portion 103 (e.g., bow portion, fore portion, nose portion), a rear portion 104 (e.g., stern portion, aft portion, tail portion), and a bottom portion 105 (e.g., ventral portion, lower portion, belly portion).

The submersible apparatus 100 is hoisted by a crane 30 located above water, on a barge 40 or from shore. The crane 30 hoists the submersible apparatus 100 to a location downstream from the anchor assembly 110. The crane 30 then lowers the submersible apparatus 100 into the water 20, toward the anchor assembly 110. The submersible apparatus 100 engages the anchor assembly 110 to remain submerged in the flow 22. Alternatively or additionally, the submersible apparatus 100 can be deployed using one or more other techniques, such as by being towed by or lowered from an aircraft (e.g., helicopter), launched from a boat ramp or from the shoreline, by being dragged directly into the body of water by the deployed anchor and a winch system, or by being towed to the deployment location by a surface vessel (e.g., a boat).

Figure 2:
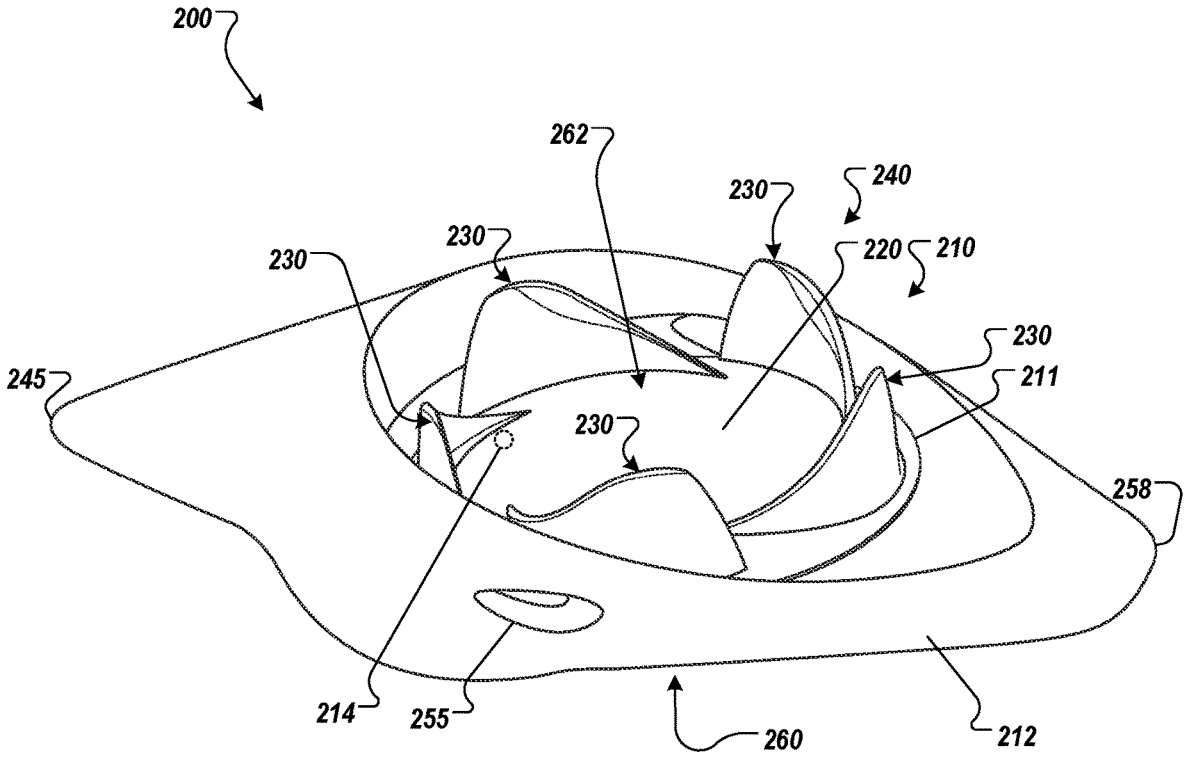
FIG. 2 is a perspective view of an example submersible apparatus.

Referring to FIG. 2, some embodiments of an exemplary turbine system 200 include a turbine 210 and an outer housing 212 that defines a rampart device 240. In some embodiments, the turbine system 200 is the example submersible apparatus 100 of FIG. 1. The outer housing 212 defines a front or bow portion 245, a rear or stern portion 258, a bottom or ventral portion 260, and a top or dorsal portion 262. The turbine system 200 defines a hydrodynamic center 214 and has a hydrodynamic shape configured to urge orientation of the turbine system 200 such that the bow portion 245 faces into an oncoming fluid flow and the stern portion 258 trails downstream relative to the fluid flow.

In some embodiments, the turbine system 200 includes a vertical-axis turbine 210 (e.g., such that the axis is arranged in a substantially vertical orientation relative to a horizontal fluid flow) that generates mechanical rotary motion to produce electrical power in response to water flowing in a river, stream, ocean, sea or other body of water having currents or flow. The turbine system 200 is shaped and oriented to provide enhanced efficiency for electrical power generation under a variety of flow conditions.

Still referring to FIG. 2, the vertical-axis turbine 210 and the housing 212 include features configured to promote efficient harnessing of kinetic energy from fluid flow 22. For example, the turbine 210 includes a central upper surface 220 and a collection of dorsally protruding fins 230. The upper surface 220 may be partially defined by a bell-shaped or conical curve such that the upper surface 220 has a generally dome or convex shape. In some optional embodiments, the upper surface 220 includes a flat or concave shape. Each of the fins 230 extends upwardly or dorsally from an outer region of the upper surface 220 of turbine 210, for example at or near an outer periphery 211 of turbine 210.

In operation, the fluid flow 22 may advance over the housing 212 to turbine 210. The fluid flow 22 is directed as it contacts and passes by one or more of the upper surface 220, a collection of channels 255, and/or the fins 230 such that kinetic energy of fluid flow 22 is harnessed to result in mechanical rotary motion of the turbine 210. The collection of fins 230 are arranged such that the turbine 210 is urged to rotate in response to the fluid flow 22. The arrangement of the fins 230 causes the turbine 210 to rotate in the same rotational direction even if the fluid flow 22 were traveling opposite to that depicted in FIG. 1.

The turbine system 200 may supported, directly or indirectly, by the example anchor assembly 110 such that the housing 212 remains generally stationary relative to the rotating turbine 210 (e.g., the housing 212 does not rotate with the turbine 210 and is completely fixed or configured to pivot relative to the anchor assembly 110 under particular conditions). In an exemplary embodiment, the turbine system 200 may be completely fixed relative to the anchor assembly 110. In other exemplary embodiments, the turbine system 200 may be able to pivot relative to anchor assembly 110. For example, turbine system 200 may be able to pivot 180 degrees or more about the cap 112 such that the turbine system 200 may have a desired orientation relative to a changing fluid flow. For example, the turbine system 200 may pivot about the cap 112 to be oriented in a first direction for a high tide current and a second direction for a low tide current. Alternatively or in addition, the turbine system 200 may be able to pivot about another (horizontal) axis such that the turbine system 200 has a selected angular orientation relative to incoming fluid flow 22 (e.g., the bow portion 103 of the turbine system 200 is tilted relative to the horizontal plane of the fluid flow 22, for example, to shift the overall orientation of combined assembly of the turbine system 200 to a tilted orientation by about +/−15-degrees). For example, the turbine system 200 may be able to articulate, manually and/or by the force of fluid flow 22, such that an angle of the turbine system 200 is varied based on the speed, turbulence, or other characteristic of fluid flow 22.

Figures 3, 4, 5:
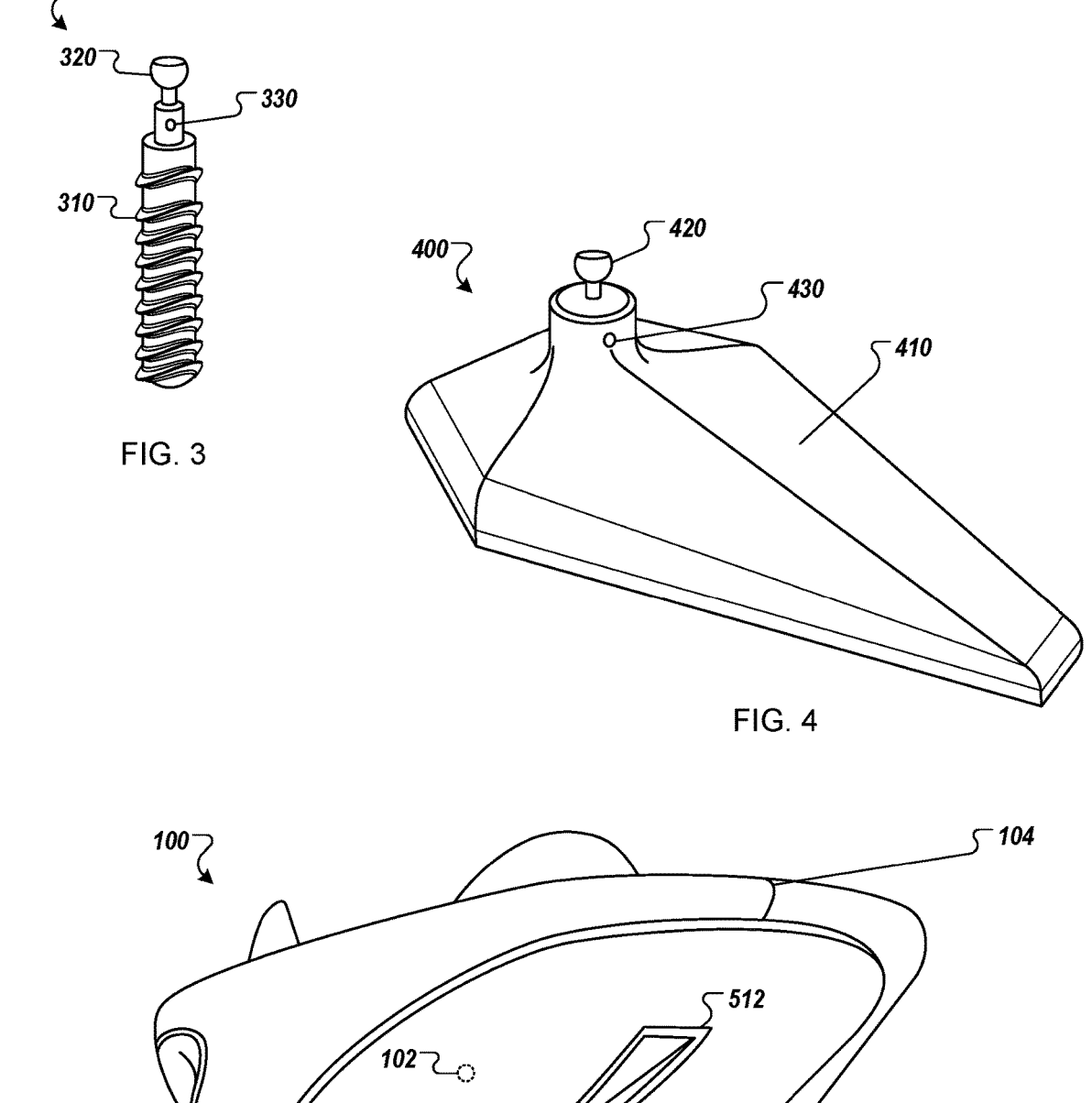
FIG. 3 shows an example of a screw anchor.
FIG. 4 shows an example of a platform anchor.
FIG. 5 shows an example submersible apparatus assembled to the example platform anchor of FIG. 4.

The example submersible apparatus 100 and/or the example turbine system 200 is configured to releasably engage with the anchor assembly 110 of FIG. 1. FIG. 3 shows an example of a screw anchor 300 for submersible use. In some embodiments, the screw anchor 300 is the example anchor assembly 110.

The screw anchor 300 is positioned below the submersible apparatus 100, the example turbine system 200, or both. The screw anchor 300 is configured to be secured to a floor (e.g., a riverbed or other ground) of the body of water 20 in which the submersible apparatus 100 is submerged. As such, the screw anchor 300 is configured to remain generally stationary and retain the submersible apparatus 100 at a predetermined position within the body of water 20.

The screw anchor 300 includes a screw piling anchor 310. The screw piling anchor 310 is a threaded body that is configured to be screwed or otherwise driven into a stationary location in a riverbed, lakebed, sea floor, canal bottom, or other appropriate feature.

The screw anchor 300 includes a cap 320. In the illustrated example, the cap 320 is configured as a ball affixed upon an end of the screw piling anchor 310. After submersed deployment, the cap 320 is arranged extend away (e.g., toward the water surface) from the bed in which the screw piling anchor 310 has been driven.

The screw anchor 300 includes a tether retainer 330 that retains a tether arranged therethrough. For example, the tether retainer 330 is configured as a bore or aperture in the screw piling anchor 310 through which a tether can pass. Alternatively or additionally, the tether retainer 330 includes one or more other features, such as an eyelet or hook that extends from (or is arranged proximal to) the screw anchor 300. In an example embodiment, the tether retainer 330 is integrally formed with one or more other features of the screw anchor 300 (e.g., including the screw piling anchor 310 and/or cap 320). In some examples, the tether retainer 330 is part of a separate assembly that is deployed proximal to the screw anchor 300.

FIG. 4 shows an example of a platform anchor assembly 400 for submersible use. In some embodiments, the platform anchor assembly 400 is the example anchor assembly 110. The platform anchor assembly 400 includes a base structure 410 that is weighted and configured to rest in a stationary location (e.g., by friction) on a riverbed, lakebed, sea floor, canal bottom, or other feature. In some embodiments, the platform anchor assembly 400 facilitates anchoring of a submersible device without altering the anchoring location (e.g., without driving an anchor into a bottom of the submerged location). For example, platform anchor assembly 400 can rest on a canal bottom or other feature that may not be suitable or desirable to penetrate with an anchoring device. In some embodiments, the platform anchor assembly 400 can be retrieved to return the anchoring location to its original condition.

The platform anchor assembly 400 includes a cap 420. In the illustrated example, the cap 420 is configured as a ball affixed upon an upper (e.g., water surface-facing side) of the base structure 410. After deployment, the cap 420 is arranged extend away (e.g., toward the water surface) from the bed upon which the platform anchor 410 has been placed.

In some embodiments, the anchor assembly 110 includes one or more legs having a longitudinal length greater than a height of the submersible apparatus 100. Such a length may facilitate stability in a variety of fluid flow and floor conditions. In various exemplary embodiments, a rampart device may be mounted in spaced relation with the anchor assembly 110, and/or the anchor assembly 110 may be spaced from the floor such that one or more passages may be present through which fluid flow may pass below the submersible apparatus 100. Such passages may result in areas of slower fluid flow promoting marine life habitation, and/or may provide space for the submersible apparatus 100 to rotate and/or articulate in response to fluid flow.

The platform anchor assembly 400 includes a tether retainer 430 configured to retain a tether arranged therethrough. For example, the tether retainer 430 is configured as a bore in the anchor base structure 410 through which a tether can pass. In other examples, the tether retainer 430 can have other configurations, such as an eyelet or hook that extends from (or is arranged proximal to) the platform anchor assembly 400. In an example embodiment, the tether retainer 430 is integrally formed with one or more other features of the screw anchor platform anchor assembly 400 (e.g., including the base structure 410 and/or cap 420). In some examples, the tether retainer 430 can be part of a separate assembly that is deployed proximal to the platform anchor assembly 400.

FIG. 5 shows the example submersible apparatus 100 assembled to the example platform anchor assembly 400. The submersible apparatus 100 includes a channel 510 defined in the ventral portion 105 of the submersible apparatus 100. The channel 510 extends from an open end 512 proximal the stern portion and configured to receive the cap, to a terminal end 514 (e.g., arranged forward of the hydrodynamic center 214) and configured to at least partly retain the cap 420 (e.g., or the caps 112 or 320).

The open end 512 is configured as an open portion with a generally U-shaped channel in cross-section having a side that is substantially open, through which the cap 420 can pass (e.g., perpendicular to the ventral portion 105). The terminal end 514 is configured with a generally C-shaped channel in cross-section having a side that provides a partly enclosed portion, retaining the cap 420 from escapement (e.g., in a direction perpendicular to the ventral portion 105).

During deployment of the submersible apparatus 100, the submersible apparatus 100 is positioned such that the cap 420 becomes at least partly arranged within the channel 510 proximal the open end 512. The submersible apparatus 100 is moved relative to the cap 420 such that the cap 420 traverses the channel toward the terminal end 514 and becomes ventrally retained within the C-shaped cross-section of the channel 510. The hydrodynamic shape of the submersible apparatus 100 orients the channel 510 so as to be substantially aligned with oncoming water flow, and fluid drag on the submersible apparatus 100 in the flow urges the cap 420 into contact with the terminal end 514.

The cap 420 and the terminal end 514 are configured to work together as a ball joint. In use, the direction of fluid flow 22 can vary slightly (e.g., shifts in flow along a river, channel, or canal) or significantly (e.g., tidal flows). The hydrodynamic configuration of the submersible apparatus 100 and the arrangement of the cap 420 at the terminal end 514 relative to the hydrodynamic center 102 cause the submersible apparatus 100 to pitch and/or turn in response to directional changes in the flow 22 such that the bow portion 103 is urged into orientation with the oncoming flow 22.

Figures 6A, 6B, 6C:
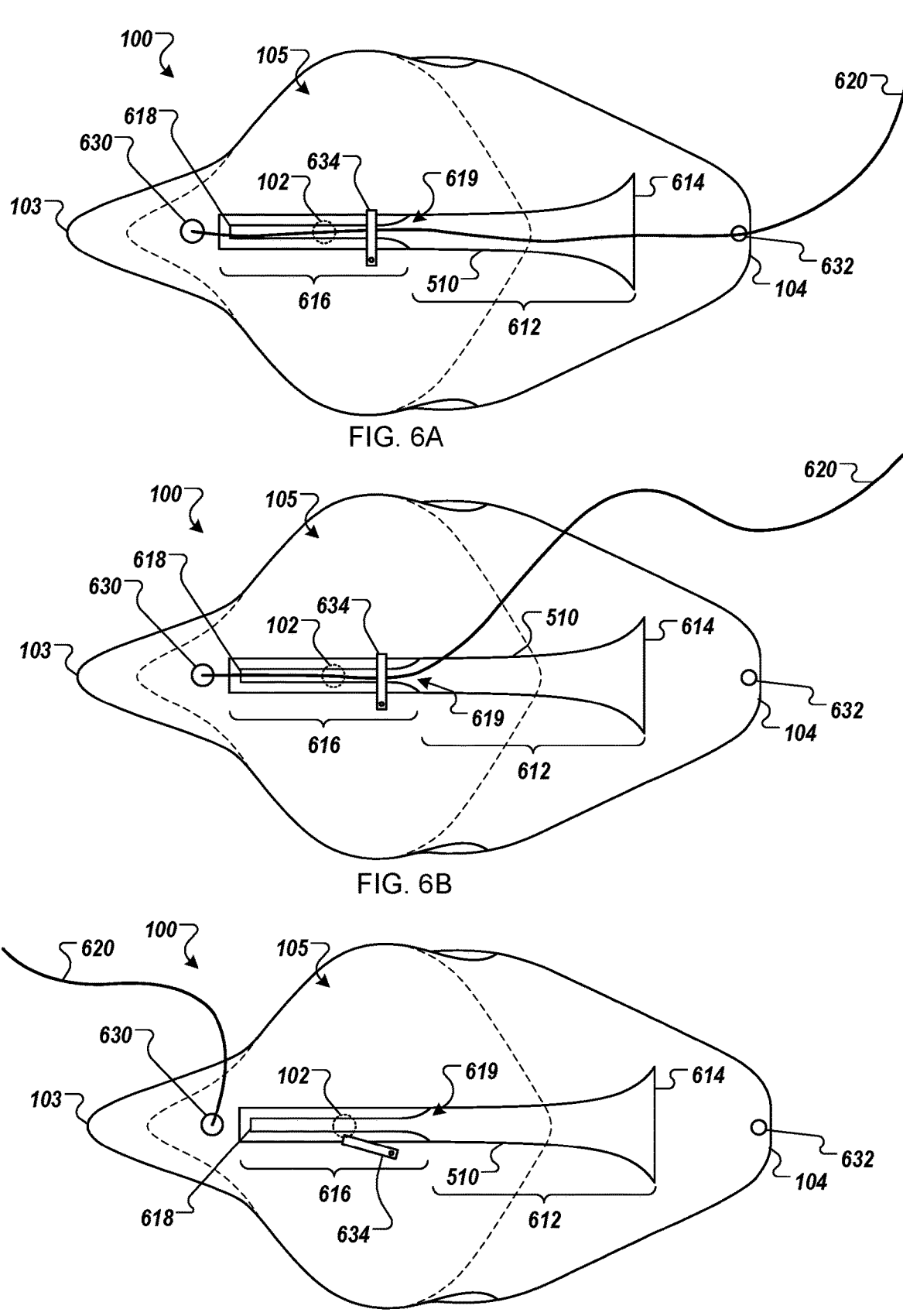
FIGS. 6A-6C are bottom views of the example submersible apparatus.

FIGS. 6A-6C are views of the ventral portion 105 of the example submersible apparatus 100. The channel 510 includes a U-shaped portion 612 that extends from an open end 614 to a C-channel portion 616 that extends to a terminal end 618.

One or more tethers 620, such as an electrical cable line, hose, cable (e.g., braided steel cable), and/or a pipeline, may extend from a primary attachment point 630 proximal the bow portion 103 of the submersible apparatus 100 toward a non-submerged electronics system (e.g., a power or control station on shore). In some embodiments, the tether 620 can output electrical current generated from an electrical generator (e.g., the turbine system 200) to the non-submerged electronics system. Alternatively or in addition, an electronics system may be partially or fully located on an above-surface platform constructed over the surface of the body of water 20. In some embodiments, the electronics system can include an inverter and transmission system that is configured to condition the electrical power from the tether 620 for output to an electrical load or an external grid system. For example, the electronics system can be configured to output the electrical power as three-phase 120V AC power that is transmitted to the external power grid. In some alternative embodiments, the electronics system may house the electric generator. In those circumstances, the tether 620 can be configured to provide a pressurized fluid path (e.g., for hydraulic fluid) that is pumped to a fluid motor to the power of the mechanical rotary motion of the electric generator.

The tether 620 is detachably affixed to the submersible apparatus 100 at a deployment attachment point 632 arranged proximal the stern portion 104 and configured to releasably affix the submersible apparatus 100 to the tether 620. In the illustrated example, the tether 620 is releasably retained within the channel 510 by a retainer 634 arranged proximal to an entrance 619 to the C-channel portion 616.

In an initial state of submersible deployment, such as the example configuration shown in FIG. 6A, the tether 620 is affixed to the primary attachment point 630 and/or the deployment attachment point 632, and is retained within the channel 510 by the retainer 634. In the initial deployment configuration illustrated example of FIG. 6A, since the tether is affixed to the deployment attachment point 632, the submersible apparatus 100 will be urged into a stern-first orientation by drag and the fluid flow 22. This stage of submersible deployment will be discussed further in the descriptions of FIGS. 7A-7D.

In an intermediate state of submersible deployment shown in FIG. 6B, such as when the cap 112 has been engaged with the U-shaped portion and the channel 612 has been drawn over the cap 112 such that the cap has entered the entrance 619 of the C-channel portion 616, the tether 620 is released from the deployment attachment point 632. In some implementations, release of the deployment attachment point 632 can be triggered by a remote signal (e.g., from the surface). In some implementations, release of the deployment attachment point 632 can be triggered by the retainer 634. For example, the retainer 634 is configured to be pivoted (e.g., as shown in FIG. 6C) by travel of the cap 112 through the channel 510.

In the intermediate state of submersible deployment, the tether 620 is no longer affixed to the deployment attachment point 632 and is no longer acting on the submersible apparatus 100 at a location to maintain the stern portion 104 into the flow 22. The hydrodynamic shape of the submersible apparatus 100 will cause the flow 22 to urge the submersible apparatus 100 to rotate about the hydrodynamic center 102, as will be discussed further in the description of FIG. 7F.

In a final state of submersible deployment, such as the example configuration shown in FIG. 6A, the tether 620 is released from both the deployment attachment point 632 and the retainer 634. This stage of deployment will be discussed further in the descriptions of FIG. 7G.

FIGS. 7A-7G show the example system 10 and the example submersible apparatus 100 in various stages of submersible deployment. In the illustrated examples, the crane 30 is positioned on a platform 702 (e.g., shore, riverbank, canal wall, barge, ship) directly upstream from the anchor assembly 110. The submersible apparatus 100 is being deployed in the body of water 20 having the flow 22.

The anchor assembly 110 is embedded or otherwise fixed at a bottom location 704 (e.g., river bottom, seabed, canal bottom) of the body of water 20. In some embodiments, the anchor assembly 110 is provided in the form of the example anchor platform assembly 400 of FIG. 4 (e.g., in embodiments in which a gravity anchor may be preferable to a screw piling anchor, such as in man-made, concrete channels where penetration of the bottom 704 may be damaging to structural integrity).

The submersible apparatus 100 is tethered to the crane 30 or other tether retractor apparatus by the tether 620. In the illustrated example, the tether 620 extends from the crane 30, down to the anchor assembly 110, and back up to the submersible apparatus 100. In some embodiments, the tether 620 can also be tethered to an electrical load on shore, such as an electrical generator. The tether 620 is releasably affixed to the submersible apparatus 100 at the deployment attachment point 632 and the primary attachment point 630. The anchor assembly 110 is configured with a tether retainer 111 through which the tether 620 extends.

Figure 7A:
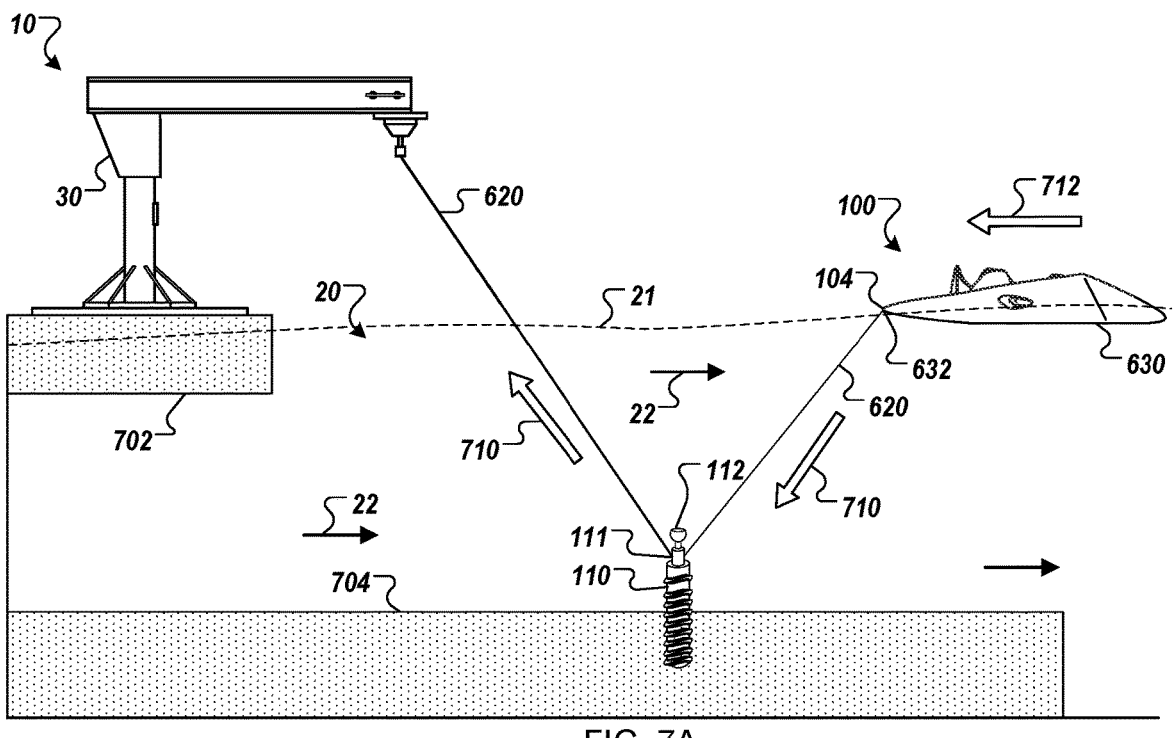
FIGS. 7A-7G show the example deployment system and the example submersible apparatus in various stages of submersible deployment.

Referring now to FIG. 7A, the submersible apparatus 100 is floating on a surface 21 of the body of water 20. In various embodiments, the submersible apparatus 100 can be configured to have a positive buoyancy. For example, the submersible apparatus 100 can float unless it is anchored or retained in a way to keep the submersible apparatus 100 submerged.

At the start of deployment, the submersible apparatus 100 is allowed to drift downstream from the anchor assembly 110 based on the flow 22. With the tether 620 affixed to the deployment attachment point 632, the submersible apparatus 100 will rotate to point the stern portion 104 into the flow 22.

The crane 30 then begins to retract the tether 620, as indicated by arrows 710. As the tether 620 is retracted, the submersible apparatus 100 is drawn across the surface 21 toward the location of the anchor assembly 110, as indicated by arrow 712.

Figure 7B:
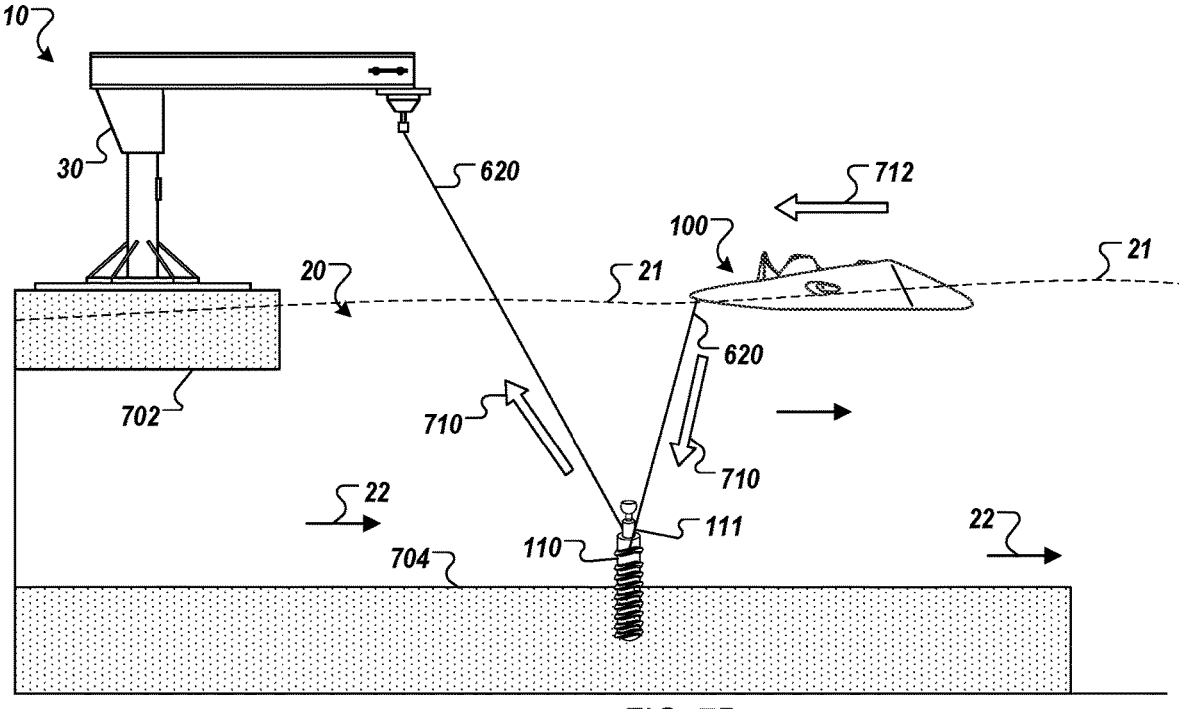

Referring now to FIG. 7B, the submersible apparatus 100 is drawn by retraction of the tether 620 to a location on the surface 21 that is substantially vertical from the anchor assembly 110.

Figure 7C:
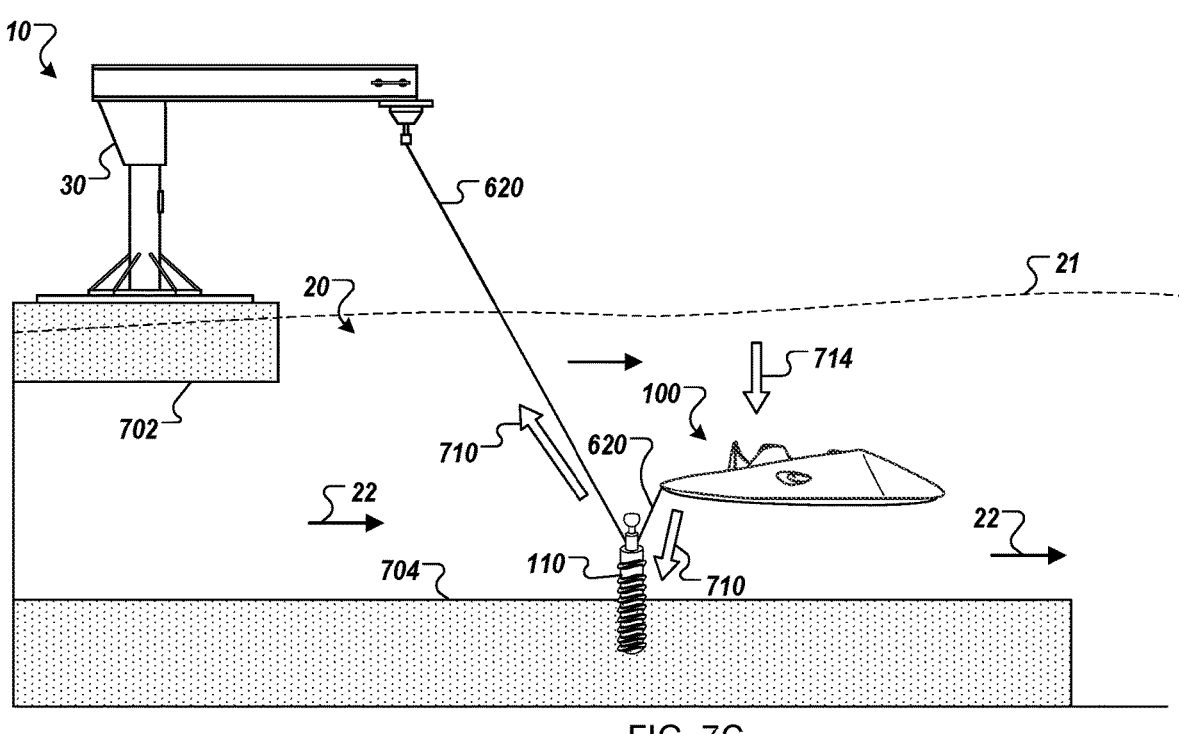

Referring now to FIG. 7C, the crane continues to retract the tether 620, drawing the submersible apparatus 100 substantially vertically downward (as indicated by arrow 714) toward the anchor assembly 110, submerging the submersible apparatus 100. In the stern-forward orientation, the hydrodynamic shape of the submersible apparatus 100 causes the flow 22 to produce substantially offsetting ventral downforce and dorsal lift based on reverse fluid flow from the stern portion 104 toward the bow portion 103.

Figure 7D:
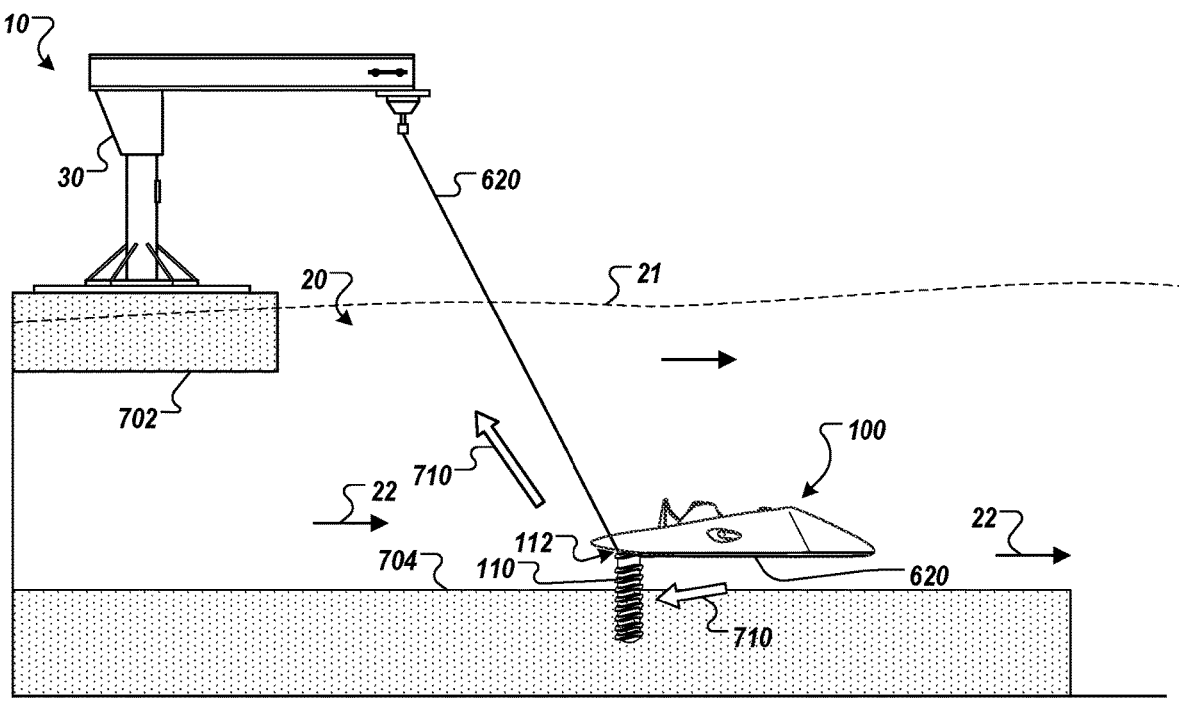

Referring now to FIG. 7D, the submersible apparatus 100 is drawn into contact with the anchor assembly 110. The cap 112 becomes partly engaged with the channel 510. For example, the relatively wide opening of the channel 510 facilitates acceptance of the cap 112 into the channel 510.

Figure 7E:
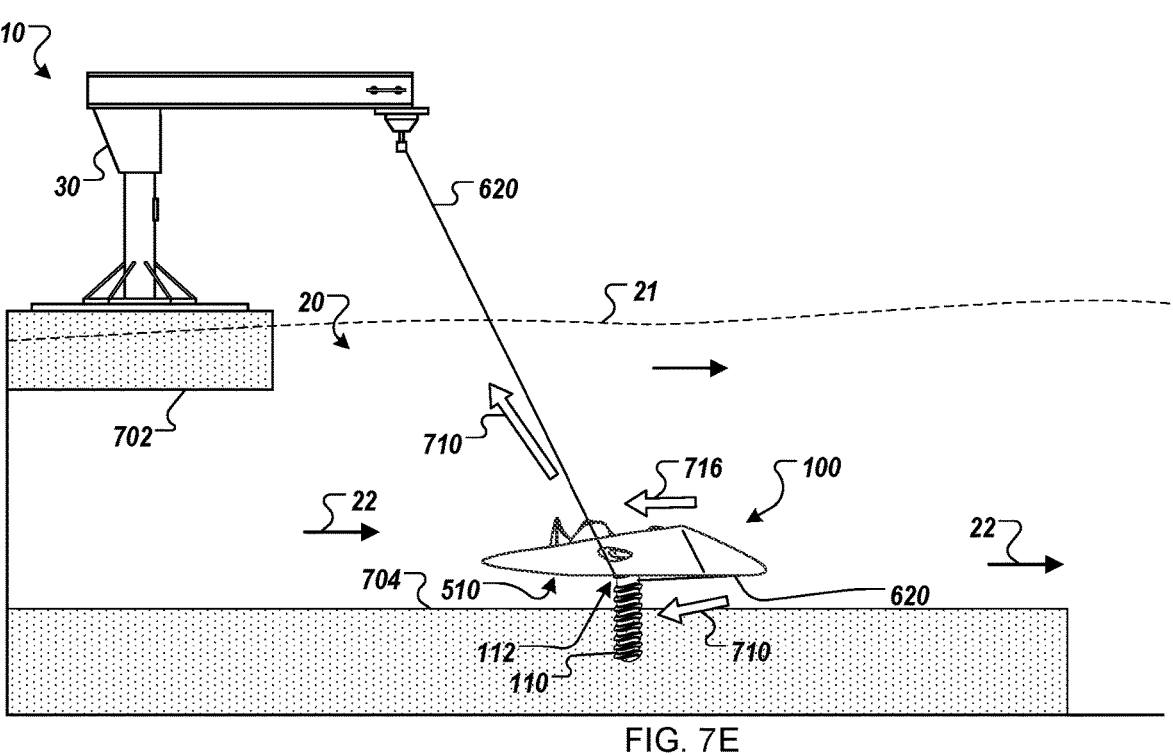

Referring now to FIG. 7E, the crane 30 continues to retract the tether 620, drawing the submersible apparatus 100 and the channel 510 over the cap 112 in a direction indicated by arrow 716. In some embodiments, the tether 620 is released from the deployment attachment point 632. In various example embodiments, release is triggered by a mechanical and/or proximity actuator such that the release occurs when a relative position between the cap 112 and channel 510 is reached. Alternatively or additionally, release may be manually actuated.

Figure 7F:
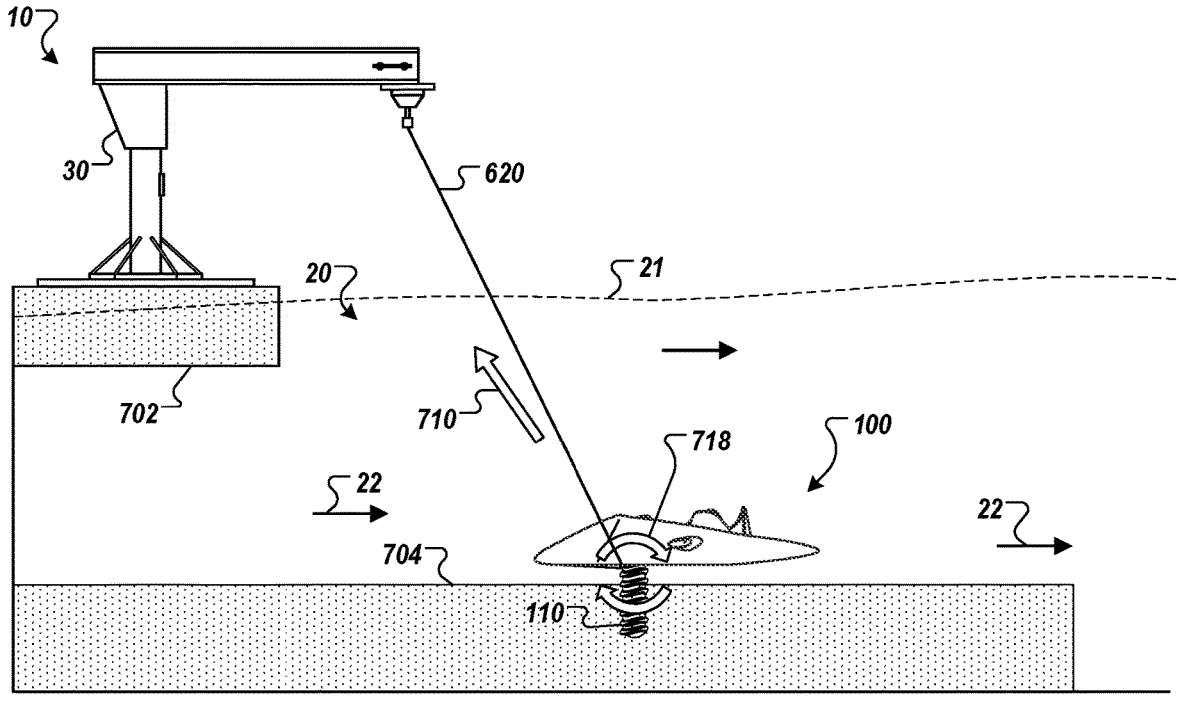

Referring now to FIG. 7F, the cap 112 has been drawn to a position in the channel that is between the hydrodynamic center 102 and the terminal end 618. In this hydrodynamically unstable configuration, the flow 22 urges rotation (as indicated by arrows 718) about the anchor assembly 110, bringing the bow portion 103 into a flow-facing orientation relative to the flow 22. The submersible apparatus rotates relative to the anchor assembly (e.g., while the anchor assembly 110, including and cap 112 remain in a fixed position), while the submersible apparatus is submerged. In the bow-forward orientation, the hydrodynamic shape of the submersible apparatus 100 causes the forward fluid flow 22 to produce a downforce on the submersible apparatus 100.

Figure 7G:
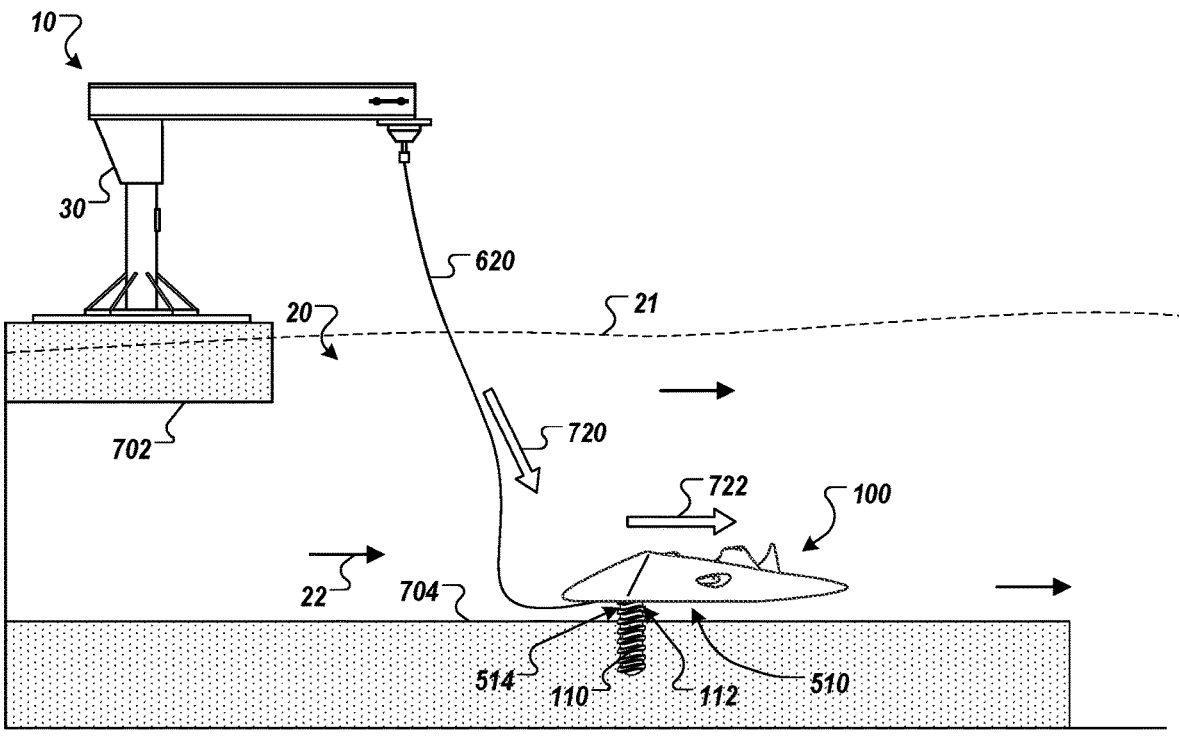

Referring now to FIG. 7G, the crane 30 extends the tether 620, as indicated by arrow 720. With tension on the tether relaxed, the flow 22 urges downstream movement of the submersible apparatus 100, as indicated by arrow 722. This downstream movement draws the channel 510 further over the anchor assembly 110, bringing the cap 112 into contact with the terminal end 514 (e.g., to releasably lock the submersible apparatus 100 to the anchor assembly 110). The submersible apparatus 100 is retained in secure engagement with the anchor assembly 110 (e.g., the cap 112 of anchor assembly 110) in part by the force of the flow 22 urging the submersible apparatus 100 in a direction such that the cap is urged towards terminal end 514.

In some embodiments, such engagement facilitates slight movement, including articulation, pivoting, rotation of the submersible apparatus 100 as a result of varied flow 22, while maintaining the cap 112 in secure engagement with channel 510.

In some embodiments, the submersible apparatus 100 can be retrieved (e.g., for maintenance) by tensioning the tether 620 such that the submersible apparatus 100 and the channel 510 is drawn over the cap 112 (e.g., against the fluid flow 22). In some embodiments, the tether 620 is drawn until the cap 112 escapes the open end 512. The tether 620 can be given additional slack, allowing the submersible apparatus 100 to at least partly drift in the flow 22. When the submersible apparatus 100 moves with flow 22, the flow 22 no longer creates a downforce based on the hydrodynamic shape of the submersible apparatus 100, and the submersible apparatus 100 can float to the surface 21 based on its internal buoyancy. Once surfaced, the submersible apparatus 100 can be affixed to lifting sling or other affixment apparatus at the surface 21 for retrieval, such as onto the platform 702 or the barge 40.

Figure 8:
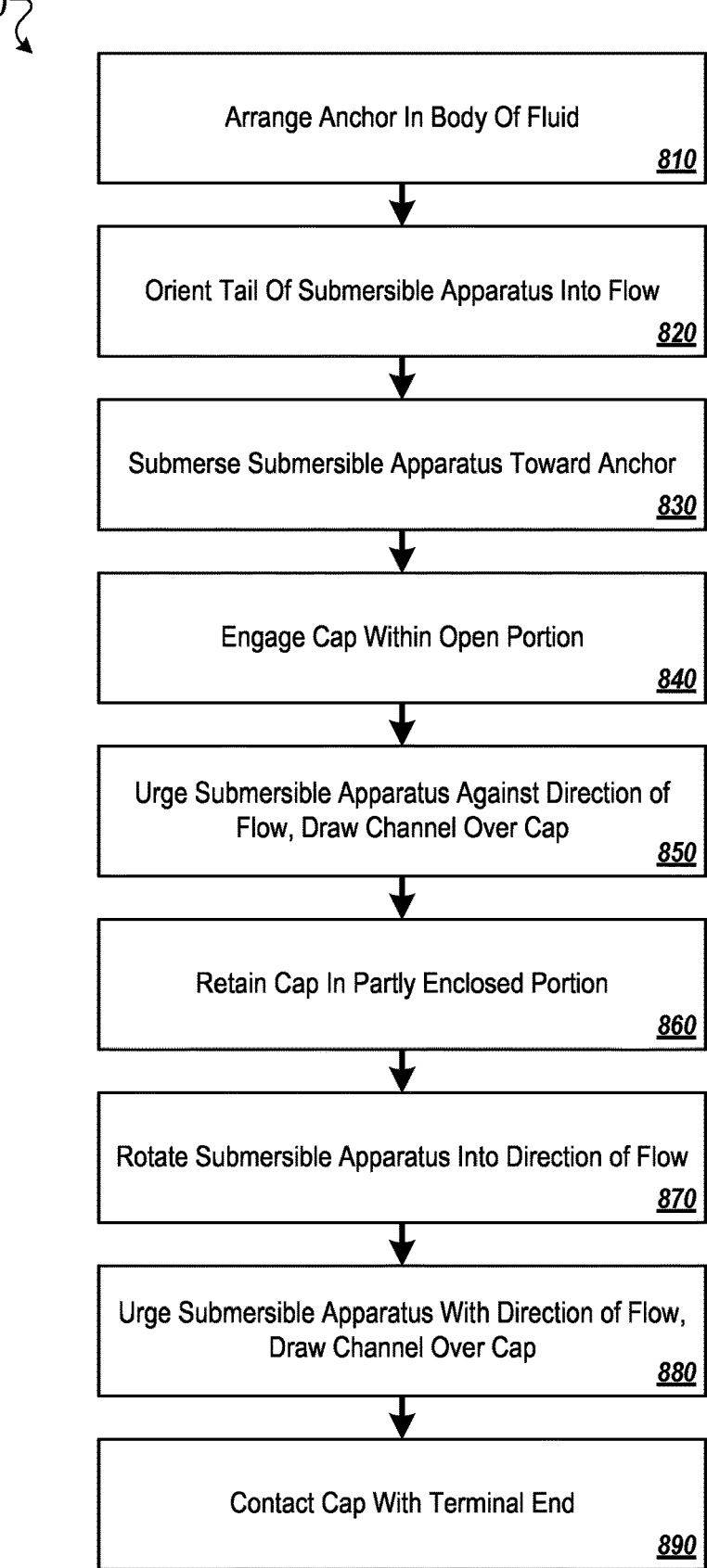
FIG. 8 is flow chart that shows an example of a process for deployment and anchoring of a submersible apparatus.

FIG. 8 is flow chart that shows an example of a process 800 for deployment and anchoring of a submersible apparatus. The process 800 may be performed, for example, by a system such as the example system 10 of FIG. 1, and/or one or more features or components of other examples described with reference to FIGS. 2-7G. For clarity of presentation, the description that follows uses the system 10 as an example for describing the processes. However, another system, or combination of systems, may be used to perform the processes 800.

At 810, an anchor is arranged at a predetermined location proximal to a bottom of a region of a body of fluid having a direction of flow. For example, the example anchor assembly 110 can be installed in the bottom 704 of the body of water 20.

In some implementations, arranging the anchor at the predetermined location proximal to the bottom of a region of a body of fluid having the direction of flow can include screwing the anchor into the bottom, wherein the anchor is configured as a screw piling anchor. For example, the screw anchor 300 can be screwed or otherwise driven into the bottom 704.

In some implementations, arranging the anchor at the predetermined location proximal to the bottom of a region of a body of fluid having the direction of flow can include submerging the anchor to the bottom, wherein the anchor is configured as a gravity anchor. For example, the platform anchor assembly 400 can be laid upon the bottom 704.

At 820, a tail portion of a submersible apparatus is oriented into the direction of flow. The submersible apparatus has a hydrodynamic center and defines a nose portion, the tail portion, a ventral portion, and a channel defined along the ventral portion. The channel has an open portion extending from an open end proximal the tail portion to a partly enclosed portion having a terminal end arranged forward of the hydrodynamic center. For example, in the illustrated examples of FIGS. 7A and 7B, the submersible apparatus 100 is initially deployed with the stern (e.g., tail) portion 104 oriented to face into the flow 22.

In some implementations, the process 800 can include affixing a tether to a deployment attachment point arranged proximal to the tail portion, tensioning the tether, and urging the tail portion of the submersible apparatus into the direction of flow based on the direction of flow and the arrangement of the deployment attachment point. For example, as shown in FIG. 7A, the tether 620 can be releasably attached to the deployment attachment point 632, and the tether 620 can be tensioned by the crane 30 and/or drag from the flow 22 to cause the stern portion 104 to face into the flow 22.

At 830, the submersible apparatus is submerged toward the anchor. For example, as shown in FIG. 7C the crane 30 can retract the tether 620, drawing the submersible apparatus 100 below the surface 21 and toward the anchor assembly 110.

At 840, a cap of the anchor is engaged within the open portion. For example, as shown in FIG. 7D, the submersible apparatus 100 is drawn toward the anchor assembly 110 until the cap 112 engages with the open, U-shaped portion 612 of the channel 510.

At 850, the submersible apparatus is urged against the direction of flow such that the channel is drawn over the cap. For example, as shown in FIG. 7E, the submersible apparatus 100 is drawn upstream with its stern portion 104 facing into the flow 22, such that the cap 112 slides further along the channel 510 toward the C-channel portion 616 that is partly enclosed.

At 860, the retaining the cap retained within a partly enclosed portion. For example, the cap 112 can be drawn into the C-channel portion 616 and at least partly retained within the C-channel portion 616.

At 870, the submersible apparatus is rotated about the cap such that the nose portion faces into the direction of flow. For example, as shown in FIG. 7F, the flow 22 can urge the submersible apparatus 100 to rotate about the cap 112 to bring the bow portion 103 into an orientation that faces into the flow 22.

At 880, the submersible apparatus is urged with the direction of flow such that the channel is drawn over the cap. For example, drag from the flow 22 over the submersible apparatus 100 can urge downstream movement of the submersible apparatus 100 relative to the anchor assembly 110. As shown in FIG. 7G, the crane 30 can provide slack on the tether 620, allowing the submersible apparatus 100 to drift slightly downstream, causing the channel 510 to be drawn further over the cap 112.

At 890, the cap is contacted with the terminal end based on the urging of the submersible apparatus with the direction of flow. For example, as shown in FIG. 7G, the crane 30 can provide slack on the tether 620, allowing the submersible apparatus 100 to drift slightly downstream, causing the channel 510 to be drawn further over the cap 112 until the cap 112 contacts the terminal end 618.

In some implementations, the process 800 can include affixing a tether to the submersible apparatus, extending the tether from the submersible apparatus, through a retainer of the anchor, to a tether retractor apparatus, where submersing the submersible apparatus toward the anchor can include retracting, by the tether retractor apparatus, and drawing, by the tether, submersible apparatus toward the retainer. For example, the screw anchor 300 includes the tether retainer 330. The tether 620 can be threaded through the tether retainer 330, as shown in FIGS. 7A-7F, such that when the crane 30 retracts the tether 620 to pull the submersible apparatus 100 down toward the anchor assembly 110.

In some implementations, the process 800 can include electrically connecting a tether to the submersible apparatus and to an electrical load, where the submersible apparatus comprises an electrical generator configured to generate an electrical current along the tether. For example, the tether 620 can be electrically connected to the submersible apparatus 100 at the primary attachment point 630 at one end, and can be connected to a power-consuming device or electrical grid onshore.

The method of claim 6, further comprising urging a ventral downforce based on a hydrodynamic shape of the submersible apparatus and a forward fluid flow from the nose portion toward the tail portion, and produce substantially offsetting ventral downforce or dorsal lift based on the hydrodynamic configuration and a reverse fluid flow from the tail portion toward the nose portion.

In some implementations, the process 800 can include drawing the channel over the cap, escaping the cap from the channel, and surfacing the submersible apparatus based on a positive buoyancy of the submersible apparatus. For example, the crane 30 can retract the tether 620 to urge movement of the submersible apparatus 100 relative to the anchor assembly 110, drawing the channel 510 over the cap 112 such that the cap 112 is moved away from the terminal end 618 toward the open end 614. With the cap 112 escaped from the channel 510, the submersible apparatus 100 will become uncoupled from the anchor assembly 110. The submersible apparatus 100 can have a net positive buoyancy that can cause the submersible apparatus 100 to float up to the surface 21 where it can be retrieved (e.g., for service, inspection, replacement).

In some implementations, the submersible apparatus can include a vertical-axis turbine that rotates about an axis in response to fluid flowing toward the turbine in a flow direction that is generally perpendicular to the axis, the vertical-axis turbine including a dorsal portion and a plurality of dorsally protruding fins extending from an outer region proximate an outer periphery of the vertical-axis turbine. For example, the turbine system 200 can be deployed as the submersible apparatus 100.

In some implementations, the process 800 can include generating electrical power in response to rotation of the vertical-axis turbine caused by fluid flowing over the rampart device and vertical-axis turbine and interacting with the plurality of dorsally protruding fins. For example, the turbine system 200 can be removably affixed to the anchor assembly 110, where the flow 22 can cause the fins 230 to rotate and spin an electrical generator that can produce electrical power that can travel up the tether 620 to an electrical load on shore.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A submersible system comprising:
an anchor having a cap configured to be submerged along a bottom of a body of water;
a submersible turbine configured to rotate relative to the anchor while submerged to releasably lock the submersible turbine to the anchor;
an outer housing having a hydrodynamic shape configured to orient the submersible turbine relative to a fluid flow and having a hydrodynamic center, the outer housing defining a bow portion, a stern portion, and a ventral portion;

a primary attachment point configured to affix the submersible turbine to a tether; and
a deployment attachment point arranged proximal the stern portion and configured to releasably affix the submersible turbine to the tether,
wherein a channel is defined in the outer housing and extends from an open end proximal the stern portion and configured to receive the cap, to a terminal end arranged forward of the hydrodynamic center and configured to at least partly retain the cap.

2. The submersible system of claim 1, wherein the submersible turbine includes a socket in a lower face to releasably mate with cap of the anchor.

3. The submersible system of claim 1, wherein the outer housing is configured to produce a ventral downforce based on a forward fluid flow from the bow portion toward the stern portion, and is configured to produce substantially offsetting ventral downforce and dorsal lift based on a reverse fluid flow from the stern portion toward the bow portion.

4. The submersible system of claim 1, wherein the channel is configured as a U-shaped channel proximal to the open end, and the channel is configured as a C-shaped channel proximal to the terminal end and configured to at least partly retain the cap.

5. A method of submersible deployment, comprising:
submersing a submersible turbine toward an anchor seated along a bottom of a body of water so that tail portion of the submersible turbine is oriented closer to a cap of the anchor and upstream of a nose portion of the submersible turbine;
urging the submersible turbine against a direction of flow of the body of water such that a channel defined along a ventral portion of the submersible turbine is drawn over a cap of the anchor; and
while the cap is slidably engaged the submersible turbine, rotating the submersible turbine about the cap such that the nose portion is oriented upstream of the tail portion.

6. The method of claim 5, further comprising:
arranging the anchor at a predetermined location proximal to a bottom of a region of a body of fluid having a direction of flow;
orienting the tail portion of the submersible turbine into the direction of flow, the submersible turbine having a hydrodynamic center and defining the nose portion, the tail portion, the ventral portion, and the channel defined along the ventral portion, the channel having an open portion extending from an open end proximal to the tail portion to a partly enclosed portion having a terminal end arranged forward of the hydrodynamic center;
engaging the cap of the anchor within the open portion;
retaining the cap within the partly enclosed portion;
urging the submersible turbine with the direction of flow such that the channel is drawn over the cap; and
contacting the cap with the terminal end of the channel along a ventral portion of the submersible turbine in response to movement the submersible turbine with the direction of flow.

7. The method of claim 6, wherein arranging the anchor at the predetermined location proximal to the bottom of a region of a body of fluid having the direction of flow further comprises screwing the anchor into the bottom, or submerging the anchor to the bottom.

8. The method of claim 5, further comprising:
affixing a tether to the submersible turbine;

extending the tether from the submersible turbine, through a retainer of the anchor, to a tether retractor apparatus; wherein:

submersing the submersible turbine toward the anchor comprises retracting, by the tether retractor apparatus; and drawing, by the tether, submersible turbine toward the retainer.

9. The method of claim 5, further comprising electrically connecting a tether to the submersible turbine and to an electrical load, wherein the submersible turbine comprises an electrical generator configured to generate an electrical current along the tether.

10. The method of claim 5, further comprising;

affixing a tether to a deployment attachment point arranged proximal to the tail portion of the submersible turbine;

tensioning the tether; and urging the tail portion of the submersible turbine into the direction of flow based on the direction of flow and the arrangement of the deployment attachment point.

11. The method of claim 10, further comprising urging a ventral downforce based on a hydrodynamic shape of the submersible turbine and a forward fluid flow from the nose portion toward the tail portion, and produce substantially offsetting ventral downforce or dorsal lift based on a hydrodynamic configuration of the submersible turbine and a reverse fluid flow from the tail portion toward the nose portion.

12. The method of claim 5, further comprising:

drawing the channel over the cap;

escaping the cap from the channel; and surfacing the submersible turbine based on a positive buoyancy of the submersible turbine.

13. An assembly for submersible use, comprising:

an anchor comprising:

a cap; and a base affixed to the cap and configured to maintain a position submerged at a predetermined location proximal a bottom of a region of a flowing body of fluid; and a submersible apparatus comprising:

an outer housing having a hydrodynamic shape configured to orient the submersible apparatus relative to a fluid flow and having a hydrodynamic center, the outer housing defining a bow portion, a stern portion, and a ventral portion; and a channel defined along the ventral portion and extending from an open end proximal the stern portion and configured to receive the cap, to a terminal end arranged forward of the hydrodynamic center and configured to at least partly retain the cap.

14. The assembly of claim 13, wherein the channel is configured as a U-shaped channel proximal to the open end, and the channel is configured as a C-shaped channel proximal to the terminal end.

15. The assembly of claim 13, wherein the base comprises a screw piling anchor or a gravity anchor.

16. The assembly of claim 13, wherein the submersible apparatus further comprises a primary attachment point configured to affix the submersible apparatus to a tether, and a deployment attachment point arranged proximal the stern portion and configured to releasably affix the submersible apparatus to the tether.

17. The assembly of claim 13, wherein the anchor further comprises a tether retainer configured to retain a tether arranged therethrough.

18. The assembly of claim 13, wherein the outer housing is configured to produce a ventral downforce based on a forward fluid flow from the bow portion toward the stern portion, and is configured to produce substantially offsetting ventral downforce and dorsal lift based on a reverse fluid flow from the stern portion toward the bow portion.

19. The assembly of claim 13, wherein the submersible apparatus comprises:

a vertical-axis turbine that rotates about an axis in response to fluid flowing toward the vertical-axis turbine in a flow direction that is generally perpendicular to the axis, the vertical-axis turbine including a dorsal portion and a plurality of dorsally protruding fins extending from an outer region proximate an outer periphery of the vertical-axis turbine.

\* \* \* \* \*